Jan. 20, 1959 R. C. ZIMMERMAN 2,869,882
HAND TOOL
Filed Feb. 15, 1957
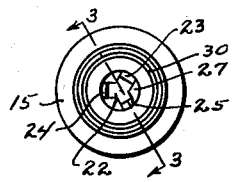
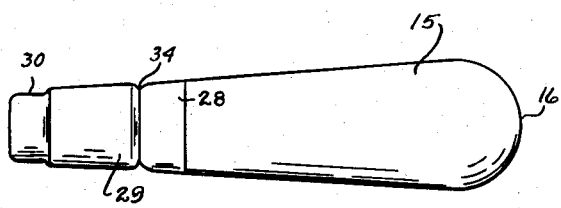
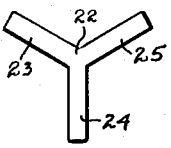
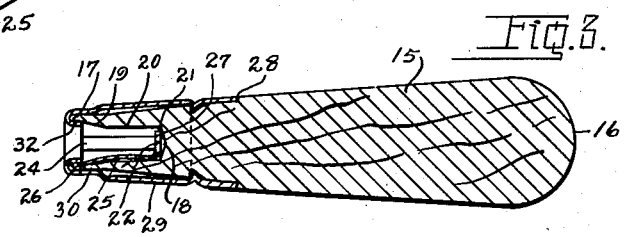
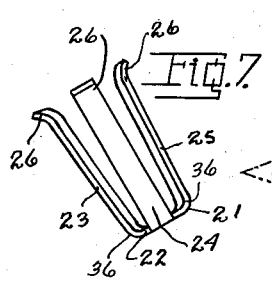
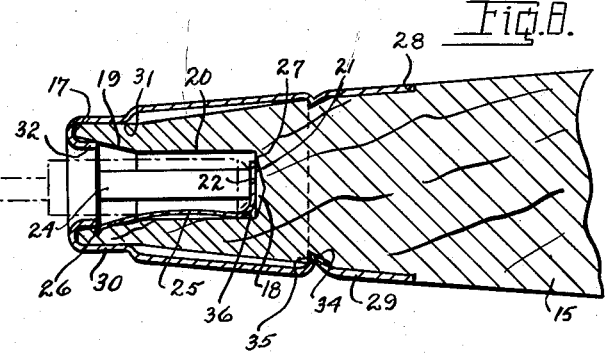
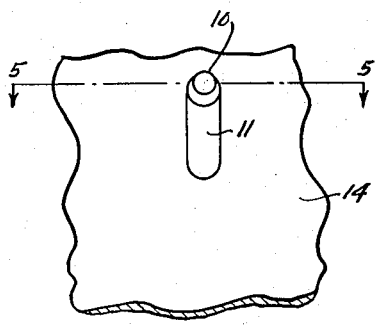
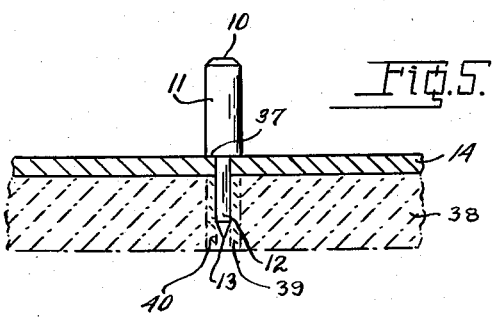
INVENTOR.
RALPH C. ZIMMERMAN
BY
Joseph A. Rave
Attorney United States Patent Office 2,869,882
Patented Jan. 20, 1959

2,869,882

HAND TOOL

Ralph C. Zimmerman, Norwood, Ohio, assignor to Zimmerman Packing Company, Norwood, Ohio, a corporation of Ohio Application February 15, 1957, Serial No. 640,433

5 Claims. (Cl. 279—23)

This invention relates to improvements in a hand tool, particularly a hand tool for use in supporting an article for subsequent use such as insertion through material.

Generally, the hand tool includes a handle member having at its one end a chuck for receiving the article to be handled for subsequent disposition with respect to material.

The principal object, therefore, is the provision of a hand tool in the form of a handle having at its free end a chuck.

Another object of the present invention is the provision of a hand tool for accomplishing the foregoing object relative to which the article may be readily inserted and removed without manipulation of the chuck.

A further object of the invention is the provision of a hand tool for accomplishing the foregoing objects in which the chuck is conveniently in the form of a spring chuck whereby the article may be readily associated with the hand tool and yieldably released after placement.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is an elevational view of a hand tool embodying the principles of the present invention.

Fig. 2 is an end elevational view of the hand tool as seen from the left hand end of Fig. 1.

Fig. 3 is a longitudinal sectional view through the hand tool as seen from line 3—3 on Fig. 2.

Fig. 4 is a fragmentary perspective view illustrating the placement of the article by the hand tool.

Fig. 5 is a longitudinal sectional view through the article after placement in the material as seen from line 5—5 on Fig. 4.

Fig. 6 is an expanded plan view of a blank from which the spring chuck of the hand tool is formed.

Fig. 7 is an enlarged perspective view of the spring chuck, per se, as erected from the blank of Fig. 6 and forming a detail of the invention.

Fig. 8 is an enlarged sectional view of a portion of Fig. 3 for more clearly illustrating the details of the hand tool of the present invention.

Throughout the several views of the drawings similar reference characters are employed to denote the same or similar parts.

The present invention relates to a hand tool for placing a centering pin relative to gasket material prior to the cutting or formation of a gasket and which centering pin constitutes the center of the resulting gasket. A gasket cutter with which the centering pin may be employed is disclosed in the pending application of Ralph C. Zimmerman which was filed on January 31, 1957, under Serial No. 637,576, for Cutting Tool.

Specifically, and referring to Figs. 4 and 5, the centering pin is indicated by the reference numeral 10 and includes an enlarged body portion 11 from the lower end of which projects a reduced portion 12 having its free end pointed as at 13. In practice the reduced and pointed portion 12 of the pin is inserted through gasket material 14 which is frequently quite tough and resists penetration except under considerable pressure. Since the enlarged portion 11 of the pin 10 is relatively small in diameter, generally less than ¼", finger pressure thereon is extremely difficult and uncomfortable. The use of a hammer on the pin to penetrate the gasket material 14 in the first place is cumbersome and secondly would mar the pin to the extent of preventing its subsequent use with the gasket cutter. The use of pliers and the like is likewise cumbersome and pin damaging, wherefore the development of the hand tool of the present invention.

The hand tool of the present invention comprises a handle member 15 preferably formed of wood having its outer end rounded as at 16 for comfort against the palm of the hand while in use. The handle 15 is tapered from its rounded edge 16 to its reduced end 17, and which is substantially normal to the axis of the handle the handle taper has been judiciously selected so that it may be conveniently gripped in the fingers.

The handle 15 is provided inwardly of its reduced end 17 with a socket 18 having a tapered entrant portion 19 followed by a substantially cylindrical portion 20 and terminating in a base or seat 20.

Disposed in the socket 18 is the spring chuck 21 formed from the blank of Fig. 6. As shown in Fig. 6 the blank comprises a central or base portion 22 from which radiates a plurality of arms equally spaced, there being illustrated in the drawings three such arms 23, 24 and 25. The arms 23, 24, and 25 are subsequently upwardly bent with respect to the base 22 with said arms having a normal slightly outwardly extended angle, as illustrated in Fig. 7 with each of the arms 23, 24 and 25 having its outer or free end slightly outwardly bent or curved as fingers as at 26 in Fig. 7. The angle of outward extent of the arms 23, 24 and 25 is such that the normal dimension across said arms, free ends or fingers 26 is greater than the diameter of the socket 18 at its outer end as exemplified by the outer end of the tapered portion 19 of said socket.

In practice the spring chuck 21 is inserted into the socket 18 until its base 21 is seated on the base 27 of the socket 18. By this construction the free ends or outwardly bent fingers 26 of the chuck arms 23, 24 and 25 are disposed against the tapered portion 19 of the socket 18 at a point inwardly of its outer end.

In order to retain the chuck 21 in its operative position use is made of a metal sleeve, sometimes referred to as a ferrule, indicated in its entirety by the reference numeral 28. The sleeve 28 includes a body portion 29 having a taper in general corresponding to the taper of the handle 15. The outer end of the sleeve 28 is provided with a portion or nose 30 which is non-tapered for receiving a substantially similarly non-tapered portion or nose 31 of the handle 15. The outer end of the sleeve portion 30 is upset and inwardly turned as an inwardly projecting ring or flange 32 thereby providing a recess between itself and the sleeve portion 30 into which the end 17 and the non-tapered portion 31 of the handle 15 is forced.

The relationship of the parts are such that the inwardly projecting flange or ring 32 of the sleeve 28 engages the outer or free ends of the arms 23, 24 and 25 for forcing the out-turned fingers 26 thereof into the handle member 15 for thereby securely anchoring the chuck within the socket 18. In the securing of the chuck in operative position each of the said fingers 23, 24 and 25 is inwardly arched as illustrated in Figs. 3 and 7 by the finger 25 thereby reducing the passageway into the chuck to a point below the diameter of the pin body portion 11. The sleeve 28 is retained on or secured to the body 15 by an inwardly projecting fin or ridge 34 which embeds itself behind a shoulder 35 formed in the handle member by a notch formed circumferentially thereof.

In practice the enlarged body portion 11 of the pin 10 is inserted into the spring chuck as illustrated in phantom lines in Fig. 7. The said insertion of the pin body portion 11 outwardly yieldably forces the chuck arms 23, 24 and 25 thereby yieldably retaining the pin within the chuck. The outward spring of the chuck arms 23, 24 and 25 is permitted by the curved portion 36 of each spring arm through which it is joined to the chuck base 21. The grip of the chuck on the pin while yieldable is such as to prevent inadvertent loss of the pin from the chuck during handling of the tool. With the pin in the chuck the hand tool is gripped and the pointed end 13 of the pin placed at the desired point of the gasket material 14 with said gasket material held upwardly of any solid surface whereupon pressure on the handle 15 pushes the pin through the material 14 until the pin shoulder 37, at the base of its enlarged body portion 11, engages the upper surface of said material 14. The material 14 is of such toughness that it grips the reduced end 12 of the pin with sufficient tightness that the handle 15 may be readily stripped from the pin body portion 11 leaving the pin in the material 14 with its reduced end 12 projecting therebelow and its body portion upstanding thereabove.

In the cutting of a gasket use is made of a cutting board illustrated in phantom lines in Fig. 5 and indicated by the reference numeral 38 and which board is provided, generally centrally thereof, with a metallic sleeve 39 having a central passageway 40 which has a diameter to closely receive the reduced portion 12 of the pin.

From the foregoing, it will be readily appreciated that there has been provided a hand tool having at its free end a spring chuck which readily receives an article, gasket cutter centering pin, for placement in material, the gasket material, and that the objects initially set forth above have been accomplished.

What is claimed is:

1. A hand tool of the class described comprising a handle having a socket inwardly of one of its ends, said socket including a base at its inner end and an outwardly flared portion at its outer end, a spring chuck comprising a base on the socket base and a yieldably displaceable spring arm from said chuck base having its outer end on the flared portion of the socket, and means carried by said one end of the handle securing said spring arm and chuck in the socket with said spring arm yieldably inwardly arched.

2. A hand tool of the class described comprising a handle having a socket inwardly of one of its ends, said socket including a base at its inner end and an outwardly flared portion at its outer end, a spring chuck comprising a base of the socket base and a yieldably displaceable spring arm from said chuck base having its outer end on the flared portion of the socket, and means carried by said one end of the handle impinging the free end of the spring arm against said flared end of the socket and securing said spring arm and chuck in the socket with said spring arm yieldably inwardly arched.

3. A hand tool of the class described comprising a handle having a rounded end and tapered from said rounded end to its other end, said handle in its other end having a socket with a base at the inner end of the socket and a flared portion at the outer end thereof, a spring chuck within said socket having a base on the socket base and a spring arm outwardly of the chuck base, said spring arm having its free end on said socket flared portion, and a ring secured in said socket flared portion for impinging the free end of the spring arm between itself and the flared portion of the socket.

4. A hand tool of the class described comprising a handle having a rounded end and tapered from said rounded end to its other end, said handle in its other end having a socket with a base at the inner end of the socket and a flared portion at the outer end thereof, a spring chuck within said socket having a base on the socket base and a spring arm outwardly of the chuck base, said spring arm having its free end on said socket flared portion, a ring secured in said socket flared portion for impinging the free end of the spring arm between itself and the flared portion of the socket, and a sleeve integral with the ring exteriorly of the handle for securing the ring and spring arm in operative positions.

5. A hand tool of the class described comprising a handle of generally tapered construction having its larger end rounded and its smaller end substantially normal to its axis, a socket inwardly of its smaller end including a base at the inner end of the socket and a flared portion at the outer end thereof, a spring chuck within said socket having a base on the socket base and a plurality of upwardly and outwardly flaring spring arms, said spring arms each having an outwardly bent finger at its free end disposed on the flared portion of the socket, and a ferrule on the smaller end of the handle including an inwardly turned flange projecting into the flared portion of the socket and providing a recess between said ferrule and its inturned flanged receiving said flared end of the handle, said out-turned fingers of the spring arms being located beneath the ferrule flange for impingement by the said ferrule flange for securing the spring arms and chuck within the socket.

References Cited in the file of this patent

UNITED STATES PATENTS

| 1,909,353 | Hughes et al. | May 16, 1933 |
| 2,271,266 | Kost | Jan. 27, 1942 |
| 2,620,209 | Flora | Dec. 2, 1952 |

FOREIGN PATENTS

| 555,019 | France | Mar. 15, 1923 |